United States Patent
Aronson et al.

(10) Patent No.: US 8,232,994 B2
(45) Date of Patent: Jul. 31, 2012

(54) VIEWING MULTI-DIMENSIONAL DATA IN TWO DIMENSIONS

(75) Inventors: David F. Aronson, Woodinville, WA (US); Michael D. Anderson, Redmond, WA (US); Paul L. Bleisch, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 11/508,001

(22) Filed: Aug. 22, 2006

(65) Prior Publication Data

US 2008/0049040 A1    Feb. 28, 2008

(51) Int. Cl.
*G06T 15/00*    (2011.01)
(52) U.S. Cl. ...................................................... 345/427
(58) Field of Classification Search ................... 345/427
See application file for complete search history.

(56) References Cited

U.S. PATENT DOCUMENTS

| | | | |
|---|---|---|---|
| 5,495,563 A * | 2/1996 | Winser | 345/582 |
| 6,154,215 A * | 11/2000 | Hopcroft et al. | 345/418 |
| 616,981 A | 1/2001 | Parker et al. | |
| 659,057 A1 | 7/2003 | Geshwind | |
| 699,909 A1 | 2/2006 | Wang et al. | |
| 2002/0085219 A1 | 7/2002 | Ramamoorthy | |
| 2003/0007673 A1 | 1/2003 | Truyen et al. | |
| 2003/0200191 A1 | 10/2003 | Pao et al. | |
| 2005/0060667 A1 | 3/2005 | Robbins | |
| 2005/0131924 A1 * | 6/2005 | Jones | 707/100 |
| 2005/0151751 A1 | 7/2005 | Hong et al. | |
| 2005/0264566 A1 * | 12/2005 | Sommers | 345/423 |
| 2006/0017722 A1 | 1/2006 | Hong et al. | |
| 2007/0206008 A1 * | 9/2007 | Kaufman et al. | 345/424 |

FOREIGN PATENT DOCUMENTS

WO    WO2005004064 A1    1/2005

OTHER PUBLICATIONS

Havlicek, H., "Theoretic Descriptive Geometry", published Mar. 13, 2005, 5 pages, downloaded from <http://www.geometrie.tuwien.ac/havlicek/proj306.html> on May 11, 2006.

Deutsches Klimarechenzentrum GmbH, "Visualization Software Used at DKRZ", publication date unknown, 3 pages, downloaded from <http://www.dkrz.de/dkrz/services/vis/Visualisierungs SW?setlang=en_US> on May 10, 2006.

(Continued)

*Primary Examiner* — Edward Martello (57) ABSTRACT

Various technologies for visualizing a multi-dimensional view object in a two-dimensional format are described. In accordance with one described embodiment, an interface for visualizing a multi-dimensional view object in two dimensions includes a surface selection tree panel, a view object information panel, and a visualization panel. The surface selection tree panel displays a surface selection tree associated with the multi-dimensional view object. A number of other surface selection trees associated with the multi-dimensional view object also exist and can be displayed if selected. The surface selection trees include one or more surfaces associated with the multi-dimensional view object. The view object information panel complements the surface selection tree panel by displaying information associated with the multi-dimensional view object. Furthermore, the visualization panel displays an image or a spreadsheet-like numeric representation of the surface area that corresponds to a currently selected surface.

20 Claims, 6 Drawing Sheets

OTHER PUBLICATIONS

Grinstein, et al., "High-Dimensional Visualizations," 7th Data Mining Conference-KDD 2001, San Francisco, California, 2001, 14 pages, downloaded from <http://www.cs.uml.edu/~mtrutsch/research/High-Dimensional_Visualizations-KDD2001-color.pdf> in May 2006.

Alpert, J., "3-Dimensional Animated Displays for Sifting Out Medium Range Weather Events and Severe Weather Using NCEP Model Ensembles", 19th Conference on IIPS, Feb. 2003, pp. 1-3, downloaded from <http://www.ams.confex.com/ams/pdfpapers/57342.pdf> in May 2006.

* cited by examiner

VIEWING MULTI-DIMENSIONAL DATA IN TWO DIMENSIONS

BACKGROUND

In the field of computer graphics, the term resource is used to refer to an area in memory that can be accessed by the rendering pipeline. In order for the pipeline to access memory efficiently, data that is provided to the pipeline (such as input geometry, shader resources, textures etc) is stored in a resource.

Furthermore, because more than one pipeline stage may need access to the same resource, the concept of a resource view is introduced. A resource view identifies the portion of a resource that can be accessed. In particular, a resource view allows a pipeline stage to access only the sub-resources it needs, in a representation desired by an application program.

Often, resource views (also referred to as view objects) include multiple dimensions of data. In one example, a view object can include a X-axis dimension, a Y-axis dimension, a Z-axis dimension, a MIP-map dimension, and a temporal dimension. Unfortunately, this abundance of information can render it difficult for software developers (e.g., game developers) to visualize the various dimensions of a view object of an application program in a meaningful way. As a result, it may be difficult for software developers to debug or optimize the application program efficiently.

SUMMARY

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various technologies for visualizing a multi-dimensional view object in a two-dimensional format are described. In accordance with one described embodiment, an interface for visualizing a multi-dimensional view object in two dimensions includes a surface selection tree panel, a view object information panel, and a visualization panel. The surface selection tree panel displays a surface selection tree that is associated with the multi-dimensional view object. A number of other surface selection trees associated with the multi-dimensional view object also exist and can be displayed if selected. The surface selection trees include one or more surfaces associated with the multi-dimensional view object. The view object information panel complements the surface selection tree panel by displaying information, such as view type and/or resource type information, associated with the multi-dimensional view object. Furthermore, the visualization panel displays an image or a spreadsheet-like numeric representation of the surface area that corresponds to a currently selected surface.

In this way, a multi-dimensional view object is illustrated two-dimensionally in a meaningful and intuitive way as to allow a user (e.g., a game developer) to easily debug or optimize an application program that generated the view object.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "setting," "storing," "scanning,"

"receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The Direct3D10® graphics application program interface introduced the concept of a resource view. A resource is a collection of data used by a graphics pipeline. A resource view refers to a resource and specifies which subset of data should be operated upon and which format the data should be interpreted as. A resource view is a lightweight wrapper for data objects and serve several purposes. In one instance, the resource view serves as a mechanism for structural sub-setting of data objects. For example, given a two dimensional MIP-mapped texture data object, a view of a single MIP-map level can be created for use as a shader input, while another view of a different MIP-map level can be utilized as another input to the shader in the same draw call. Different resource views can be used to simultaneously read from some parts of a resource and write to other parts of the resource during the same draw call, as long as no resource views bound to output stages in the pipeline overlap any resource views bound to input stages in the pipeline.

The fact that view objects have multiple dimensions of data make it difficult for software developers, especially game developers, to visualize data while they are debugging or optimizing their application. Embodiments describe technologies that display a subset of the multi-dimensional data in a meaningful way as to enable software developers to view the data in two dimensions and understand what data is being used by their application.

Figure 1:
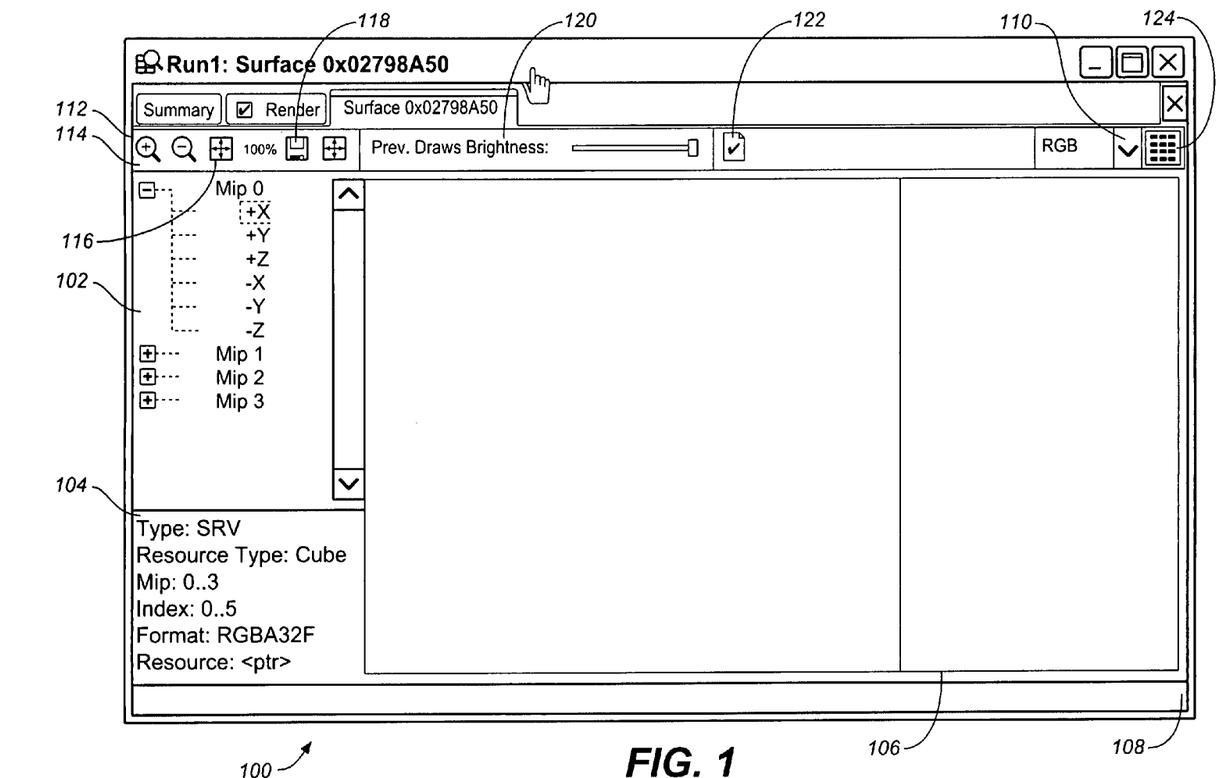
FIG. 1 illustrates a block diagram of an interface for visualizing a multi-dimensional view object in a two-dimensional format, upon which embodiments can be implemented.

FIG. 1 illustrates a block diagram of an interface 100 for visualizing a multi-dimensional view object in a two-dimensional format, upon which embodiments of the present claimed subject matter can be implemented. Interface 100 includes a surface selection tree panel 102, a view object information panel 104, a visualization panel 106 for the displaying an image that corresponds to a selected surface, a status bar 108, a pixels display mode selection panel 110, and an image viewing toolbar 112. Also, although various parts of description may illustrate a multi-dimensional data object as having five dimensions (e.g., a X-axis dimension, a Y-axis dimension, a Z-axis dimension, a MIP-map dimension, and a temporal dimension), embodiments are not limited to five dimensions and are equally applicable to any number of dimensions.

Also, although interface 100 is shown and described as having certain numbers and types of elements, the present claimed subject matter is not so limited; that is, interface 100 may include elements other than those shown, and may include more than one of the elements that are shown. For example, interface 100 can include a temporal dimension tracking control (not shown in FIG. 1). Further, although interface 100 is illustrated under the present arrangement of elements, embodiments are not limited to the present arrangement of elements illustrated in FIG. 1.

In cases where the contents of a texture change over time, a temporal dimension tracking control allows a user to make a selection at a point in time such that the visualization panel displays an image of the surface that corresponds to the selected point in time. In one example, a surface may vary with time as to display images of different numbers. In the present example, at time T(1) the image illustrates the number "1", at time T(2) the image illustrates the number "2" and so on and so forth. Thus, by using the temporal dimension tracking control, a user can select a specific time, such as time T(n), and see the corresponding number "n."

Referring now to interface 100, the surface selection tree panel 102 displays a surface selection tree that is associated with the multi-dimensional view object. In one embodiment, the surface selection tree is utilized to represents the multi-dimensional view object as a number of two dimensional surfaces. For example, for a view of a cubemap texture resource, a surface selection tree can represent it as six individual surfaces that correspond to each of the six faces of the cube (e.g., +X, +Y, +Z, −X, −Y, and −Z). This allows a user (e.g., software developer) to view the cubemap texture resource in a two dimensional approach.

Figure 2:
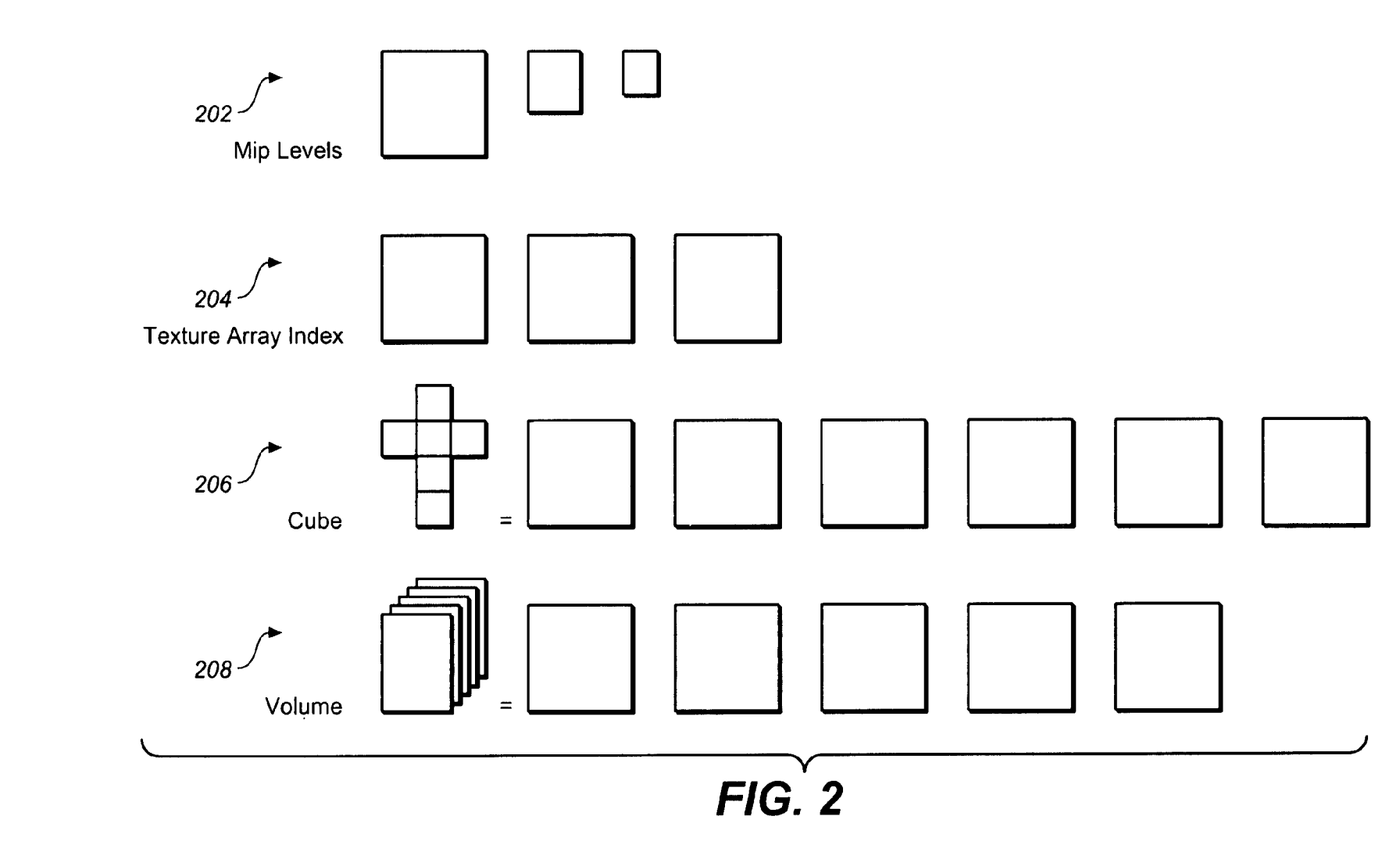
FIG. 2 illustrates a MIP level axis, a texture array index axis, a cube axis, and a volume axis, upon which embodiments can be implemented.

In one example, four axes are used to define views for a multi-dimensional object. FIG. 2 illustrates a MIP level axis, a texture array index axis, a cube axis, and a volume axis. The four axes include MIP-levels 202, texture array index 204, cube 206, and volume 208. Because cube faces (e.g., cube 206) and volume slices (e.g., volume 208) can be interpreted as specialized usages of a texture array (e.g., texture array 204), it is not possible to have a mixture of a MIP-level, a cube, and a texture array. Consequently, the valid combinations are: MIP-level; texture array index; cube; volume; MIP-level and texture array index; MIP-level and cube; and MIP level and volume. In one embodiment, a texture array contains one or more textures (all of the same type and dimensions) that can be indexed from within an application or by shaders. Texture arrays allow a user to use a single interface with multiple indexes to access many textures. A user can create as many texture arrays to manage different texture types as needed. Also, in one embodiment, a view supports the notion of a typeless resource. In other words, a user can create a resource that is of certain size but whose type is interpreted as a uint, float, unorm, etc. only when it is bound to a pipeline stage. This makes a resource re-interpretable by different pipeline stages.

Figure 3:
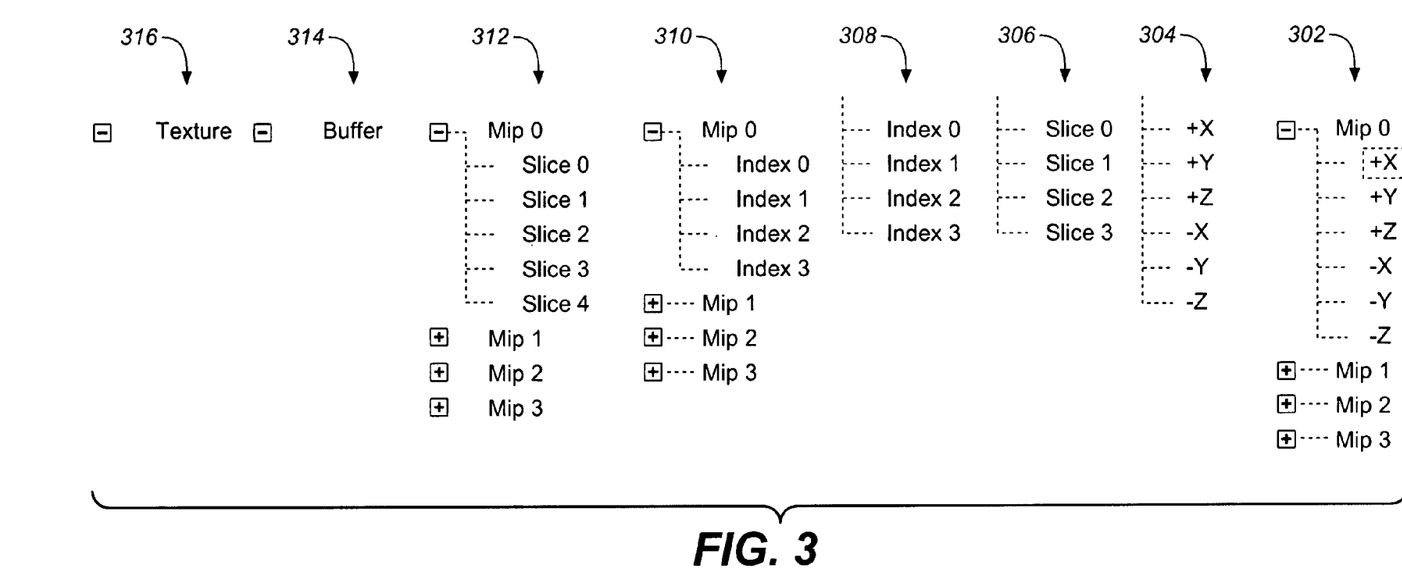
FIG. 3 illustrates a MIP-mapped cube texture selection tree, a cube texture selection tree, a three dimensional texture selection tree, a one dimensional or two dimensional texture array selection tree, a MIP-mapped one dimensional or two dimensional texture array selection tree, a MIP-mapped three dimensional texture selection tree, a single buffer selection tree, and a two dimensional or one dimensional texture selection tree, upon which embodiments can be implemented.

Also, although FIG. 1 shows a MIP-mapped cube texture surface selection tree, a number of other surface selection trees associated with the multi-dimensional view object also exist and will be displayed if selected. For example, FIG. 3 illustrates different types of selection trees. FIG. 3 shows a MIP-mapped cube texture selection tree 302, a cube texture selection tree 304, a three dimensional texture selection tree 306, a one dimensional or two dimensional texture array selection tree 308, a MIP-mapped one dimensional or two dimensional texture array selection tree 310, a MIP-mapped three dimensional texture selection tree 312, a single buffer selection tree 314, and a two dimensional or one dimensional texture selection tree 316. Surface selection trees include surfaces associated with the multi-dimensional view object. In one embodiment, each of the surface selection trees includes one or more surfaces associated with the multi-dimensional view object. The various types of surface selection trees provide software developers with different ways of looking at a multi-dimensional view object. For example, MIP-mapped cube texture selection tree 302 allows a software developer to first decide which level of detail he would like the view the multi-dimensional object in, and then the software developer can select the face of the cube that he or she is interested in. In another example, the three dimensional texture selection tree 306 allows a software developer an easy way to select a slice of a three dimensional object that he or she desires to see.

Further, in one embodiment, each surface has an associated image. In one instance, a single MIP level of a texture is referred to as a "surface." The word "texture" is used to refer to the complete set of MIP levels. The view object information panel 104 complements the surface selection tree panel by displaying information, such as but not limited to, view type, resource type, MIP levels, array index range, format, and/or resource information, associated with the multi-dimensional view object. Furthermore, the visualization panel 106 displays an image that corresponds to a currently selected surface. In one example, an image is simply a visual representation of the characteristics of a surface. A user can view the different images that correspond to the different surfaces of a surface selection tree by selecting the MIP levels, array indexes, slices, and/or faces shown on a surface selection tree. In one example, with reference to FIG. 3, by selecting "+X" of 304, an image that corresponds to "+X" is displayed on the visualization panel 106. By selecting "−X" of 304, a different image that corresponds to "−X" is displayed on the visualization panel 106. In another example, with reference to FIG. 3, by first selecting "MIP 0" of 310 and then selecting "Slice 1", a image that corresponds to "MIP 0/Slice 1" is displayed on the visualization panel 106. Subsequently, first selecting "MIP 2" of 310 and then selecting "Slice 3", a image that corresponds to "MIP 2/Slice 3" is displayed on the visualization panel 106.

Interface 100 also includes a status bar 108. The status bar displays the pixel value of a mouse cursor when the mouse cursor is within the visualization panel 106. The pixel values can include but are not limited to: pixel color; X, Y position; and U, V position. In one example the status bar 108 can display the following: 10, 255, 55, X:35(0.6), Y:178(0.8).

Additionally, interface 100 includes an image viewing toolbar 112. The image viewing toolbar allows a user to adjust how a surface is displayed in the visualization panel. The image viewing toolbar includes a variety of controls, such as but not limited to zoom 114, pan 116, save 118, previous draw brightness 120, view modification dialog button 122, pixels display mode selection panel 110, and view as spreadsheet button 124.

Figure 7:
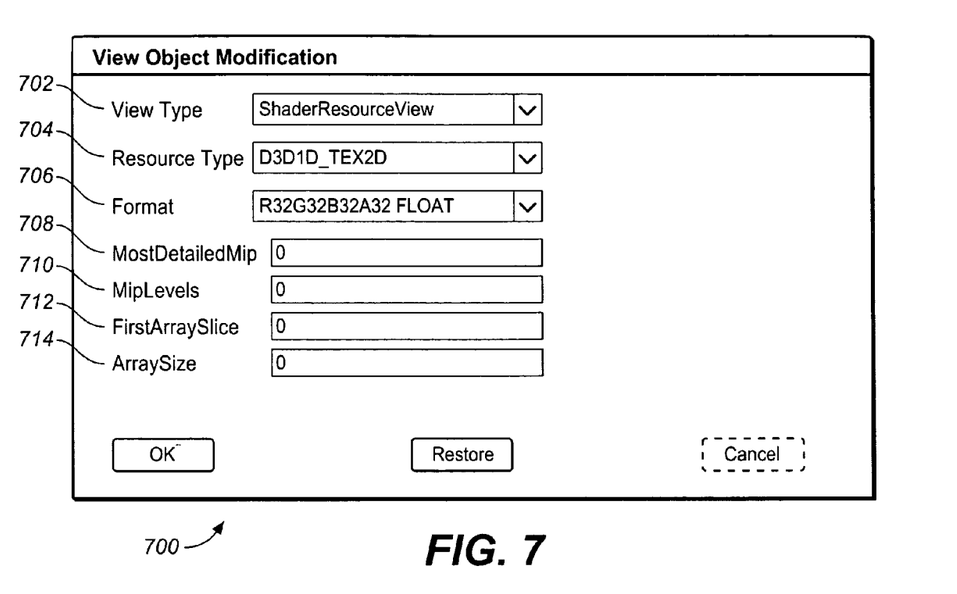
FIG. 7 illustrates an exemplary embodiment of a view modification window, upon which embodiments can be implemented.

Zoom 114 allows a user to zoom in or out of a surface. Pan 116 allows a user to view different parts of the surface. Save 118 saves the currently selected surface to a file. This saves the current view to a DDS or CSV file depending on the display mode. If a user is viewing a surface as an image it will save as an image file. If a user is viewing a surface as a spreadsheet it will save as a CSV file. The view modification dialog button 122, when selected, causes a dialog to pop-up that displays controls to change the current view for a texture. FIG. 7 illustrates an exemplary embodiment of a view modification window 700. View modification window 700 includes a view type selection box 702, a resource type selection box 704, a format selection box 706, a MostDetailedMip input box 708, a MipLevels input box 710, a FirstArraySlice input box 712, and ArraySize input box 714. The various selections boxes and input boxes allow a user to easily adjust and customize how a view object is to be displayed. The view as a spreadsheet button 124 toggles the display of the surface of the visualization panel 106 between viewing the surface as an image or as a spreadsheet (See FIG. 4).

Figure 4:
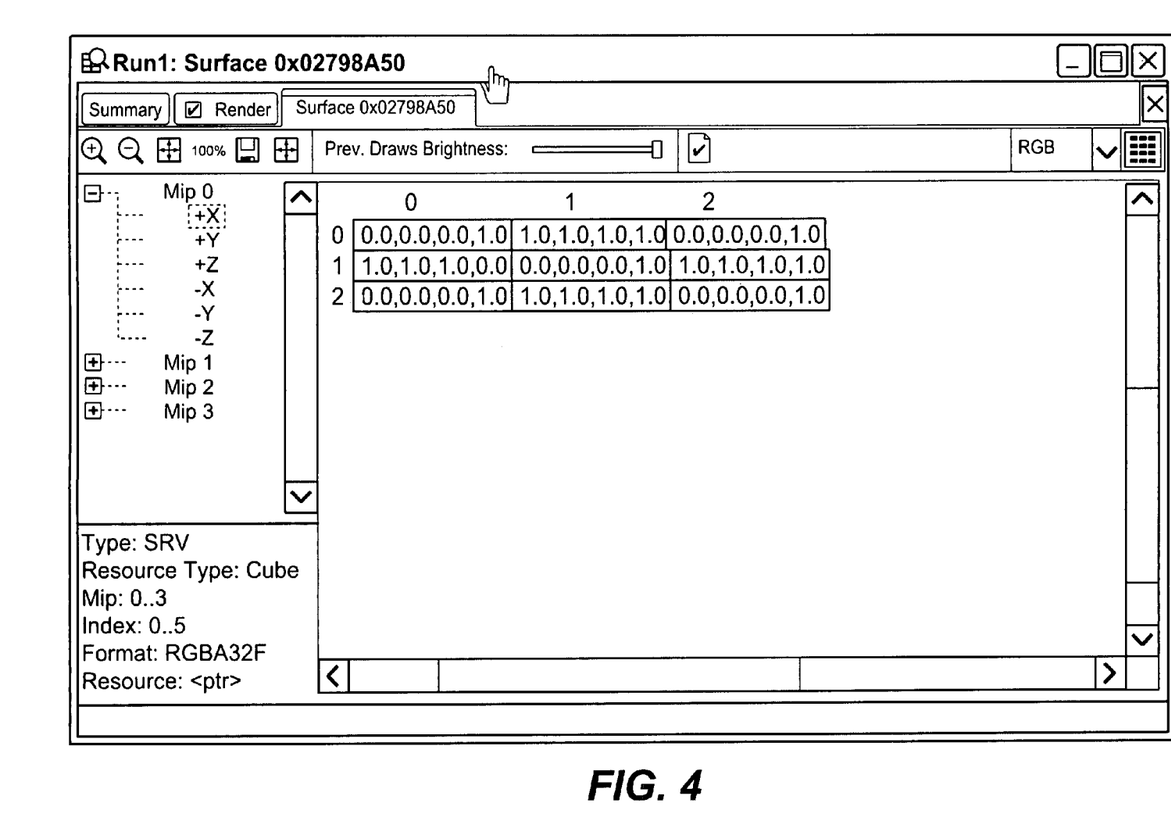
FIG. 4 illustrates an interface in spreadsheet view, upon which embodiments can be implemented.

FIG. 4 illustrates an interface 100 in spreadsheet view. In FIG. 4, the image is displayed as American Standard Code for Information Interchange (ASCII). In the present embodiment, the contents of each pixel are displayed in a numeric format rather than as color.

In FIG. 4, the column and row identification values are always displayed on the screen even when scrolled. Also, the values are displayed as float values with three significant digits for each pixel entry. Further, in this view, the zoom and pan controls are not active. If a user clicks on "save 118" when in this view, the file will be saved in CSV form. In one example, full precision floats are saved to a file for the CSV file.

The pixels display mode selection panel 110 allows a user to choose how a surface is drawn in the visualization panel 106. When selected, the pixels display mode selection panel 110 drops down and allows a user to determine which channels of the visible image to display. In one embodiment, the pixels display mode selection panel 110 defaults to RGB. In one embodiment, for Shader Resource View (SRV) and Render Target View (RTV) objects, the default is RGB. The pixels displayed in the visualization panel 106 displays all RGB values. The possible pixel mode values for SRV and RTV objects are: RGB (display each pixel as an RGB color value), RGBA (display each pixel as an RGB color value with the Alpha used as a transparency value over a checker board background), R (display only the red channel), G (display only the green channel), B (display only the blue channel), and A (display the alpha channel as a grayscale value).

For Depth Stencil Views (DSV), the default is "depth" and the possible pixel mode values for the DSV objects are: Depth (display the depth value as a gray scale and Stencil (display the stencil value as a grayscale).

The default value for the pixels display mode selection panel 110 is determined by the pixel format of the view. If the view format has RGBA, then the display mode will be RGBA. If the format is RGB, then the display mode will be RGB. If the format has only a subset of components (e.g., RG16), then only the first component is used (e.g., display mode is R).

Figure 5:
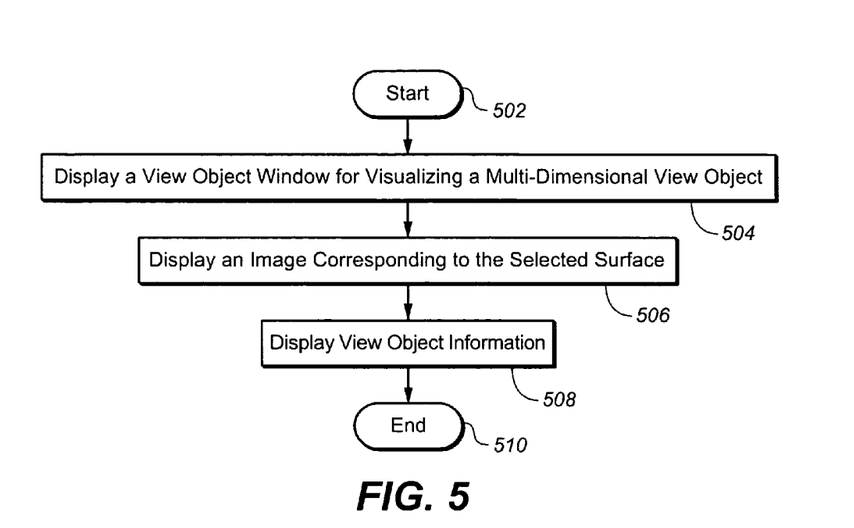
FIG. 5 illustrates a flowchart for visualizing a multi-dimensional view object, upon which embodiments can be implemented.

FIG. 5 illustrates a flowchart 500 for visualizing a multi-dimensional view object upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented. At block 502, the process starts.

At block 504, a view object window for visualizing a multi-dimensional view object is displayed. In one embodiment, multi-dimensional view objects, such as Direct3D10® objects, provide a context for how a specific texture will be used in the rendering pipeline. Because view objects only provide context to a texture object, a single texture object may have multiple views that reference it depending on the usage of the texture at a specific time. A multi-dimensional view object can be but are not limited to a Shader Resource View (SRV) type view object, a Render Target View (RTV) type view object, and/or a Depth Stencil View (DSV) type view object.

The SRV view type indicates that the texture will be used by shaders inputs to read data from. A CPU is the only component that can write to a SRV. In one embodiment, a shader resource view enables the user to bind a resource to a shader stage. A shader resource view can interpret a resource as something different from when it was created. For example, a shader resource view may interpret a Texture2DArray with six textures as a cube map. By binding this cube map view to a shader stage, the shader will sample the Texture2DArray as a cube map.

The RTV view type indicates that the texture will be written to from a pixel shader. The data can be read by another shader or by a CPU. In one embodiment, creating a render-target view for a resource will enable the user to bind the resource to the pipeline as a rendertarget. A rendertarget is a resource that will be written to by the output merger stage at the end of a render pass; after a render pass the rendertargets contain the color information of a rendered image. When creating a rendertarget view, only one MIP level of a texture resource may be used as a rendertarget. When binding a rendertarget view to the pipeline, there will be a corresponding depth stencil view that will be used with the rendertarget in the output merger stage.

The DSV view type indicates that the texture will be used to determine whether pixels will be occluded or not. The DSV view type can be read from a shader or the CPU. However, the DSV view type can only be written to by a shader. In one embodiment, creating a depth stencil view for a resource will enable the user to use the resource as depth stencil. A depth stencil view is bound to the output merger stage along with a corresponding rendertarget view.

The view object window includes a view selection tree sub-panel. The view selection tree sub-panel displays a view selection tree of a plurality of view selection trees that correspond to the multi-dimensional view object. Also, the view object window includes a view object information sub-panel. Furthermore, the view object window includes a visualization sub-panel for displaying surfaces associated with the multi-dimensional view object. In one embodiment, the plurality of view selection trees allow a user to select between MIP-levels, array indexes, slices, and faces of the multi-dimensional view object.

At block 506, in response to a user selection of a surface of one or more surfaces of the view selection tree, a surface corresponding to the selected surface of the one or more surfaces is displayed in the visualization sub-panel. Furthermore, in one embodiment, the view object window further includes an image viewing toolbar that includes a toggle button for switching between displaying a surface in a pixels format or in a spreadsheet format.

At block 508, in response to a user selection of a surface of one or more surfaces of the view selection tree, view object information associated with the multi-dimensional view object is displayed in a view object information sub-panel. In one embodiment, the multi-dimensional data comprises at least a temporal dimension, a X-axis dimension, a Y-axis dimension, a Z-axis dimension, and a MIP-map dimension. At block 510, the process ends.

Figure 6:
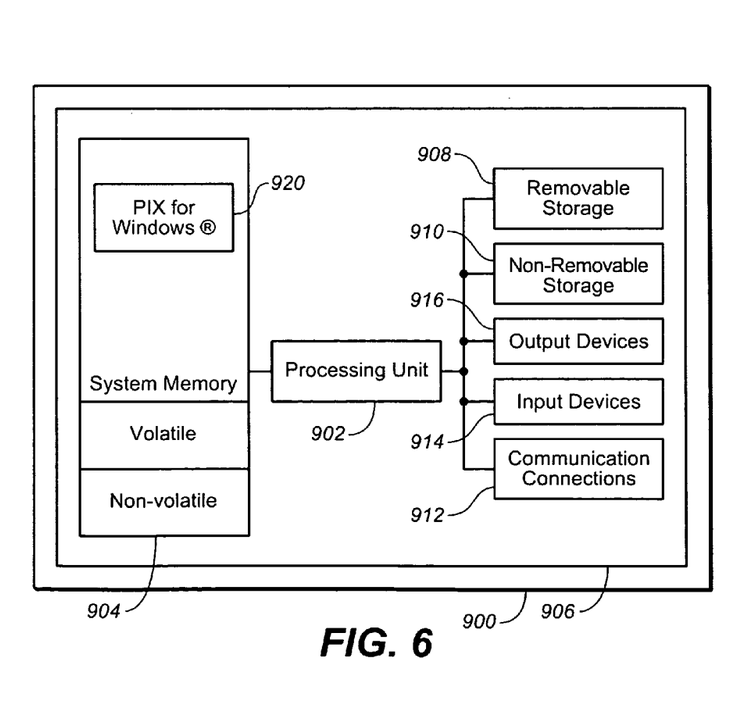
FIG. 6 illustrates an exemplary computing device, upon which embodiments can be implemented.

With reference to FIG. 6, an exemplary system for implementing the claimed subject matter includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM. flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may be utilized to implement various application programs, such as PIX for Windows® 920. In one embodiment, when executed, PIX for Windows® 920 displays a view object window for visualizing the multi-dimensional view object. The view object window includes a view selection tree sub-panel, a view object information sub-panel, and a visualization sub-panel for displaying surfaces associated with the multi-dimensional view object. Also, in response to a user selection of a surface of one or more surfaces of the view selection tree, an image corresponding to the selected surface of the one or more surfaces in the visualization sub-panel is displayed. Also, view object information associated with the multi-dimensional view object is displayed in the view object information sub-panel. In this way, a multi-dimensional view object is illustrated two-dimensionally in a meaningful and intuitive way as to allow a user (e.g., a game developer) to easily debug or optimize an application program that generated the view object.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

Embodiments introduce various technologies that allow a multi-dimensional data to be visualized in two-dimensions. A multi-dimensional view object is illustrated two-dimensionally in a meaningful and intuitive way as to enable a software developer, such as a game developer, to easily debug or optimize an application program that generated the view object. Consequently, embodiments make it possible for software developers to function more efficiently.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for presenting an interface for visualizing a multi-dimensional view object in a two-dimensional format, said method comprising:

presenting a surface selection tree panel that is controlled to display a selected one of a plurality of user-selectable surface selection trees in association with said multi-dimensional view object, wherein each of said plurality of user-selectable surface selection trees comprises one or more user-selectable MIP levels each of which includes one or more user-selectable two-dimensional surfaces associated with said multi-dimensional view object and wherein said plurality of user-selectable surface selection trees includes a MIP-mapped cube text selection tree in which each user-selectable MIP level comprises one or more user-selectable cube textures associated with said multi-dimensional view object, a MIP-mapped one dimensional or two dimensional texture array selection tree in which each user-selectable MIP level comprises one or more user-selectable textures included in a one dimensional or two dimensional texture array associated with said multi-dimensional view object and a MIP-mapped three dimensional texture selection tree in which each user-selectable MIP level comprises one or more user-selectable slices associated with said multi-dimensional view object;

presenting a view object information panel, wherein said view object information panel displays information associated with said multi-dimensional view object; and presenting a visualization panel, wherein if a two-dimensional surface of said surface selection tree is selected, then an image associated with said selected two-dimensional surface is displayed in said visualization panel.

2. The method of claim 1, wherein said view object information panel displays view type information.

3. The method of claim 1, wherein said view object information panel displays resource type information.

4. The method of claim 1, wherein said view object information panel displays MIP levels information.

5. The method of claim 1, wherein said view object information panel displays array index range information.

6. The method of claim 1, wherein said visualization panel displays said selected two-dimensional surface in a RGB pixels format.

7. The method of claim 1, wherein said visualization panel displays said selected two-dimensional surface in a spreadsheet format.

8. The method of claim 1, further comprising:
presenting a status bar, wherein said status bar displays the pixel values of a mouse cursor when said mouse cursor is within said visualization panel, and wherein said pixel values comprises pixel color, X and Y position, and U and V position.

9. The method of claim 1, further comprising:
presenting a pixels display mode selection panel, wherein said pixels display mode selection panel allows a user to choose how said selected two-dimensional surface is drawn in said visualization panel.

10. The method of claim 1, further comprising:
presenting an image viewing toolbar, wherein said image viewing toolbar allows a user to adjust how said image is displayed in said visualization panel, wherein said image viewing toolbar comprises zoom and pan controls.

11. The method of claim 1, wherein said visualization panel displays said selected two-dimensional surface in a RGB pixels format or a spreadsheet format depending upon a state of a user control in said view object information panel.

12. The method of claim 1, further comprising:
presenting a temporal dimension tracking control, wherein if said selected two-dimensional surface changes as a function of time, said temporal dimension tracking control allows a user to select a point in time such that said visualization panel displays an image of said selected two-dimensional surface that corresponds to said selected point in time.

13. A method for visualizing a multi-dimensional view object, said method comprising:
displaying a view object window on a display device for visualizing said multi-dimensional view object, comprising:
a view selection tree sub-panel, wherein a view selection tree that corresponds to said multi-dimensional view object is displayed;
a view object information sub-panel; and
a visualization sub-panel for displaying two-dimensional surfaces associated with said multi-dimensional view object;
in response to a user selection of a two-dimensional surface of one or more selectable two-dimensional surfaces within one or more selectable MIP levels of said view selection tree,
displaying a representation of said selected two-dimensional surface in said visualization sub-panel;
displaying view object information associated with said multi-dimensional view object in said view object information sub-panel; and
in response to a user interaction with a control element within said view object information sub-panel, switching from displaying a pixel representation of said selected two-dimensional surface in said visualization sub-panel to a spreadsheet representation of said selected two-dimensional surface in said visualization sub-panel.

14. The method of claim 13, wherein said view selection tree allows a user to select between one or more of MIP-levels, array indexes, slices, and faces of said multi-dimensional view object.

15. The method of claim 13, wherein said view object information sub-panel further comprises an image viewing toolbar, wherein said image viewing toolbar comprises a toggle button, and wherein said switching step is performed in response to a user interaction with said toggle button.

16. The method of claim 13, wherein said multi-dimensional view object comprises at least a temporal dimension, a X-axis dimension, a Y-axis dimension, a Z-axis dimension, and a MIP-map dimension.

17. A computer-readable storage media having computer-readable instructions thereon which, when executed, implement a method comprising: displaying a view object window for visualizing said multi-dimensional view object, comprising: a view selection tree sub-panel, wherein a view selection tree that corresponds to said multi-dimensional view object is displayed; a view object information sub-panel; and a visualization sub-panel for displaying two-dimensional surfaces associated with said multi-dimensional view object; in response to a user selection of a two-dimensional surface of one or more selectable two-dimensional surfaces within one or more selectable MIP levels of said view selection tree, displaying an image corresponding to said selected two-dimensional surface of said one or more selectable two-dimensional surfaces at a first point in time in said visualization sub-panel; and displaying view object information associated with said multi-dimensional view object in said view object information sub-panel wherein the view selection tree is selected by the user from among a plurality of view selection trees, said plurality of view selection trees including a MIP-mapped cube text selection tree in which each selectable MIP level comprises one or more selectable cube textures associated with said multi-dimensional view object, a MIP-mapped one dimensional or two dimensional texture array selection tree in which each selectable MIP level comprises one or more selectable textures included in a one dimensional or two dimensional texture array associated with said multi-dimensional view object and a MIP-mapped three dimensional texture selection tree in which each selectable MIP level comprises one or more selectable slices associated with said multi-dimensional view object.

18. The computer-readable storage media of claim 17, wherein said multi-dimensional view object is a Shader Resource View (SRV) type view object.

19. The computer-readable storage media of claim 17, wherein said multi-dimensional view object is a Render Target View (RTV) type view object.

20. The computer-readable storage media of claim 17, wherein said multi-dimensional view object is a Depth Stencil View (DSV) type view object.

* * * * *